(12) United States Patent
Fagrell et al.

(10) Patent No.: US 6,630,654 B2
(45) Date of Patent: Oct. 7, 2003

(54) MICROWAVE HEATING APPARATUS

(75) Inventors: Magnus Fagrell, Uppsala (SE); Per Olov G. Risman, Härryda (SE)

(73) Assignee: Personal Chemistry I Uppsala AB, Uppsala (SE)

( * ) Notice: Subject to any disclaimer, the term of this patent is extended or adjusted under 35 U.S.C. 154(b) by 0 days.

(21) Appl. No.: 10/268,682

(22) Filed: Oct. 11, 2002

(65) Prior Publication Data

US 2003/0106891 A1 Jun. 12, 2003

Related U.S. Application Data

(60) Provisional application No. 60/335,565, filed on Oct. 19, 2001.

(51) Int. Cl.[7] .................................................. H05B 6/74
(52) U.S. Cl. ...................... 219/695; 219/696; 219/750; 219/746; 219/761
(58) Field of Search .................. 219/695, 696, 219/697, 693, 690, 746, 750, 756, 762, 761; 34/259

(56) References Cited

U.S. PATENT DOCUMENTS

| | | | |
|---|---|---|---|
| 2,820,127 A | * 1/1958 | Argento et al. | 219/750 |
| 3,848,106 A | 11/1974 | Berggren et al. | 219/10.55 |
| 4,392,039 A | * 7/1983 | Risman | 219/695 |
| 4,681,740 A | * 7/1987 | Commarmot et al. | 219/693 |
| 4,853,507 A | * 8/1989 | Samardzja | 219/696 |
| 4,889,965 A | * 12/1989 | Gervais et al. | 219/696 |
| 5,250,773 A | 10/1993 | Lind et al. | 219/10.55 |
| 5,393,492 A | * 2/1995 | Di Martino et al. | 422/62 |
| 5,523,548 A | * 6/1996 | Tsukagoshi et al. | 219/695 |

* cited by examiner

Primary Examiner—Philip H. Leung
(74) Attorney, Agent, or Firm—Harness, Dickey & Pierce, P.L.C.

(57) ABSTRACT

Microwave heating apparatus comprising a dielectric microwave applicator provided with a microwave coupling device adapted to feed microwave energy to the applicator. The applicator is provided with a load chamber 8 extending coaxially with regard to the centre axis of the applicator from an upper end to a predetermined distance from a lower end of the applicator, the load chamber is adapted to receive a load to be heated. The dielectric applicator comprises two sections, an upper section 4 provided with the load chamber and a lower section 6 for impedance matching between the coupling device and upper section. In a preferred embodiment the lower section has an increasing cross-sectional area from the coupling device to the intersection to the upper section.

24 Claims, 5 Drawing Sheets

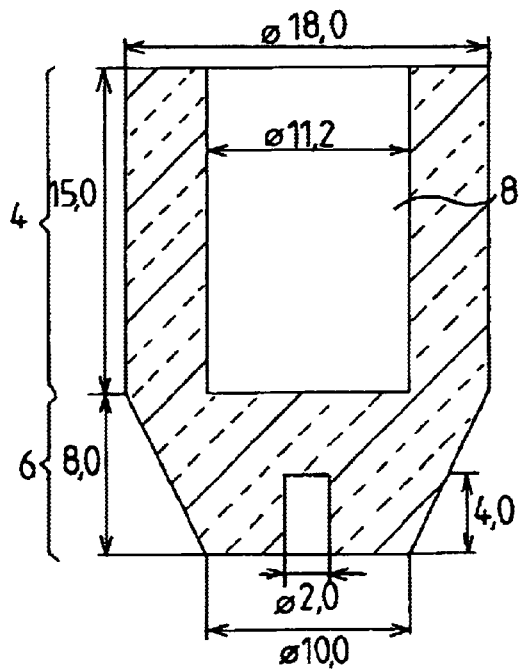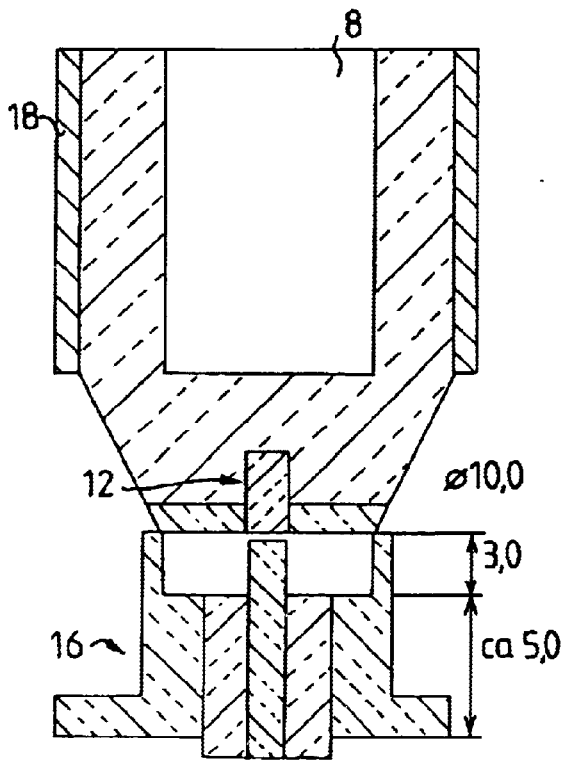
FIG.1a  FIG.1b
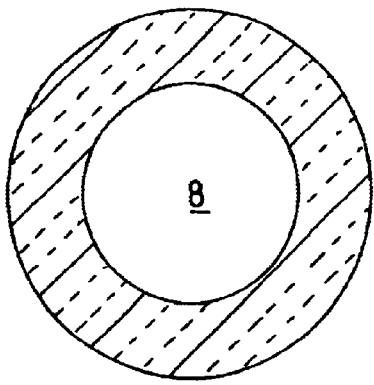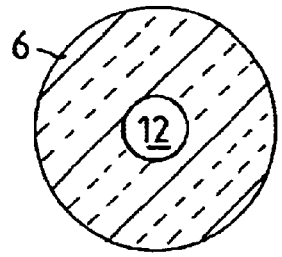
FIG.1c  FIG.1d

MICROWAVE HEATING APPARATUS

CROSS REFERENCE TO RELATED APPLICATIONS

This application claims the benefit of U.S. provisional application No. 60/335,565 filed Oct. 19, 2001.

FIELD OF THE INVENTION

The present invention relates to a microwave heating apparatus comprising a microwave applicator, a microwave heating system including the microwave heating apparatus and a method of using the microwave heating system according to the preambles of the independent claims.

BACKGROUND OF THE INVENTION

Microwave heated system for carrying out chemical reactions, and particularly organic synthesis reaction, is an important and well-known technique. Using microwave heating makes it possible to increase the reaction rate of chemical reactions with order of magnitudes. The use of microwaves also often leads to higher yield and purity of the final product.

Microwave assisted chemistry has been used for many years. However, the apparatuses and methods have to a great extent been based upon conventional domestic microwave ovens. Domestic microwave ovens have a multimode cavity and the energy is applied at a fixed frequency at 2450 MHz. The use of single mode cavities have also been reported, see e.g. U.S. Pat No. 5,393,492 and U.S. Pat No. 4,681,740.

Recent developments have led towards apparatuses comprising a microwave generator, a separate applicator for holding the load (or sample) to be treated, and a waveguide leading the generated microwave radiation from the generator and coupling it into the applicator. Even if the system consists of a $TE_{10}$ waveguide using a 2450 MHz to which a magnetron generator is connected in one end and the sample container is in the other end, there is a need for a matching device in the form of at least a metal post or iris between the generator and load, in order to achieve a reasonable efficiency.

When coupling electromagnetic radiation such as microwaves from a source to an applicator, it is important to match the transmission line impedance and the applicator impedance (with load) in order to achieve a good transfer of power. However, the dielectric properties of the load may influence drastically upon the impedance of the applicator, as well as its electrical size, and the dielectric properties of the sample often change considerably with both temperature and applied frequency. Thus, an impedance mismatch between the source and the applicator will often occur and the coupling and thereby the heating process becomes less efficient and difficult to predict.

Below follows a short background description of different transmission modes used in a microwave applicator.

Consider a hollow waveguide with a given cross section that is uniform throughout its entire length. As a result of the application of these boundary conditions to the wave equation, it can be shown that only certain unique patterns for the distribution of the electric intensity E and the magnetic intensity H (taken together) can exist in the waveguide. Each unique pattern of the field distribution is called a mode. There are two types of modes possible in a hollow waveguide—one of them being the transverse electric (TE) mode and the other the transverse magnetic (TM) mode. In the TE mode the E has only a component transverse (that is perpendicular) to the direction of propagation, whereas the H has both transversal and longitudinal components.

In the TM mode the magnetic intensity has only a transverse component and the electric intensity has both components. Each type (TE or TM) of mode has an infinite number of sub-modes which have the common characteristics of the type to which they belong, but differs among themselves in the details of field distribution.

One of the most important characteristics of a TE or TM wave is that it has a cutoff wavelength for each mode of transmission. If the free-space wavelength is longer than the cutoff value, that particular mode cannot exist in the waveguide. For any given waveguide, the mode that has the longest cutoff wavelength is known as the dominant mode. By indexing the mode, e.g. $TE_{01}$, this is indicated.

U.S. Pat. No. 4,392,039 relates to a dielectric heating applicator provided with a low-loss dielectric with a dielectric constant exceeding that of the object to be heated by microwaves. An internal resonance is excited in the applicator so that specific field pattern exists at and in the object.

According specific embodiments of the heating applicator of U.S. Pat No. 4,392,039 the dielectric is provided with an axial hole where the load can be heated (FIGS. 10–12 of U.S. Pat No. 4,392,039).

U.S. Pat No. 3,848,106 discloses an apparatus for heating by microwave energy that includes a dielectric material having low losses and a dielectric constant exceeding the dielectric constant of air. In one embodiment of this known apparatus the dielectric body is shaped as a cylindrical lining in a metal tube (illustrated in FIGS. 7 and 8 of U.S. Pat No. 3,848,106) intended for heating material with cylindrical cross-section being positioned in the tube in coaxial relationship to said tube.

The embodiment of the cylindrical dielectric material does not take into account any backwards interaction, i.e. load influence on the impedance matching conditions, or system matching.

The overall object of the microwave heating apparatus according to the present invention is to achieve a heating apparatus where the heating process is more efficient and easier to predict than in the prior art heating systems.

A further object of the present invention is to enable parallel processing of several microwave heating apparatuses arranged in a microwave heating system where each apparatus may be individually controlled with regard to temperature, time and frequency of the microwaves.

SUMMARY OF THE INVENTION

The above-mentioned objects are achieved by the present invention according to the independent claims.

Preferred embodiments are set forth in the dependent claims.

Thus, by providing a microwave applicator with the geometrical characteristics as stated in the independent claims the performance of the heating apparatus is increased.

The present invention is particularly advantageous for small load volumes. In this context a volume is considered small if it is less than 5 ml and in particular if it is less than 2 ml.

If the volume is more than about 2 ml, some technical advantages with ceramic applicator systems according to the present invention may no longer fully apply; a 2 ml load of a diameter of 10 mm becomes 25 mm high and this is so large that applicators without using a ceramic material may be used with acceptable results.

If the load volume is less than 0.4 ml it may be too difficult to control ambient influences such as cooling by a vial itself, and to measure the load temperature and pressure without disturbing it too much. A 0.5 ml load with Ø6 mm becomes 18 mm high, and another reasonably optimised load with regard to applicator design and associated sensors may have Ø9 mm, be 12 mm high and thus have a volume of about 0.75 mL.

The applicator is to be "small", to facilitate the design of compact multi-applicator systems for parallel operation. Since the applicator with load must be resonant in order for the microwave heating efficiency (the percentage of input microwave power to the applicator which is actually absorbed by the load) to become high, the characteristic size (generally: the diameter) of the applicator must be of the order of between a half and a full wavelength. At 2450 MHz this wavelength is about 120 mm in free space, so an air-filled applicator will be at least about 60 mm in diameter. By using a ceramic applicator with high permittivity instead of air, the size can be reduced by a factor of approximately the square root of the ceramic permittivity.

As an example, using a microwave ceramic with permittivity 100, the applicator diameter becomes about 17 mm (as in the preferred embodiment described below).

Below follows an overview of some considerations taken into account when developing the present invention:

There are four degrees of freedom in cases where the microwave heating apparatus is intended for heating of liquids with 0.5–1.0 ml volume using 2450 MHz microwaves. The liquids have permittivities ranging from about 10 to 70, as is the case for a vast majority of dipolar liquids over a large temperature range at this frequency.

These four degrees of freedom are: the diameter of the dielectric applicator; the permittivity of the dielectric material used in the applicator; the diameter of the load chamber and the diameter of the liquid column of the load.

The given volume then determines the height of the liquid column, and the height of the applicator is to be determined for obtaining resonance for a suitable mode.

The mode choice should be so that there can be a minimum deviation in the angular and radial variations of the heating pattern. Hence, only the lowest-order $TM_{01}$, type mode is possible in that it has no angular variation of the fields. The vertical (axial) mode index cannot be zero due to the magnetic wall effect at the top. Therefore the next lowest type is to be considered. It has two quarter-wave periods and is thus the $TM_{011}$ mode. The pattern is of course distorted in comparison with the pattern in a homogenous dielectric body. If the permittivity of the dielectric material is very high, a large part of the energy will oscillate in it and the field distribution in the hole will be close to that of the normal open-ended $TM_{011}$-mode.

According to the present invention the load diffraction is actively used to improve the overall impedance matching of the system when the permittivity and the loss factor of the load substance are varied. By using the present invention it is not required to perform any physical changes to the system for different loads.

The present invention provides a microwave feed subsystem, being the lower section of the dielectric applicator, which produces a stronger coupling to the upper section (provided with the load chamber) when the load has a low permittivity and provides a negative feedback to the upper section so that the coupling varies little when the load permittivity varies. This is achieved, according to a preferred embodiment of the present invention, by both the high permittivity ceramic dielectric material surrounding the load at close distance, and by arranging the lower section below the load, wherein the lower section is a solid cross-section, with an axial rather than a radial microwave feeding position.

There is a normal propagating mode in the cylindrical part of the applicator with load. The basic field pattern of the coaxial TE mode in the feeding section at the bottom is the same as for the $TM_{01}$ mode. In the embodiments of the present invention provided with a conical section between the microwave coupling means and the upper section, there will be an evanescent propagation of the mode, but since the axial length is short the coupling can be optimised. This embodiment of the invention results in the coupling factor of the applicator for varying load permittivity to become significantly less than otherwise—a favourable negative feedback is accomplished and results in maintaining a high efficiency of the system for variable loads.

The high dielectric properties of the ceramic applicator make it possible to construct a small applicator, that gives no radiation of microwaves and it also makes it semi-resonant since it will "buffer" the changes in the sample's dielectric properties and hence make the necessary bandwidth of the microwave generator smaller.

By arranging a predetermined number of microwave heating apparatus according to the present invention parallel processing of chemical reactions is achieved.

This is one major advantage with the dielectric applicator according to the present invention because it makes it possible to achieve the compact support structure that is a necessary condition for parallel processing.

Another major advantage is that by mounting the dielectric ceramic applicator in a thick-walled metal tube in combination with an effective pressure sealing in the upper end and the solid ceramic section at the bottom the applicator is effectively pressure sealed.

According to a further preferred embodiment of the present invention one or many small holes is/are arranged in the applicator into the load chamber, essentially in a radial direction, for pressurizing purposes, for temperature monitoring and also in order to be able to perform quick cooling by forced gas or air venting.

According to still another preferred embodiment of the invention a semiconductor based microwave generator is used. This makes it possible to vary the frequency and hence get a higher efficiency of the microwave heating system. The variation of the dielectric properties of the sample gives different resonance frequencies for the different samples and this has to be compensated for. The variation of the frequency can compensate for this and by using a semiconductor based microwave generator no mechanical tuning devices are needed. The semiconductor based microwave generator can also become very small, which makes it possible to have a number of microwave generators in the same system/instrument. No high voltage system is needed as is the case for a magnetron based system. dr

SHORT DESCRIPTION OF THE APPENDED DRAWINGS

FIGS. 1a and 1b show longitudinal sectional schematic illustrations of the microwave heating apparatus according to the present invention.

FIGS. 1c and 1d show schematic illustrations of the microwave heating apparatus according to the present invention in a cross-sectional view of the upper and lower sections, respectively.

Figure 5:
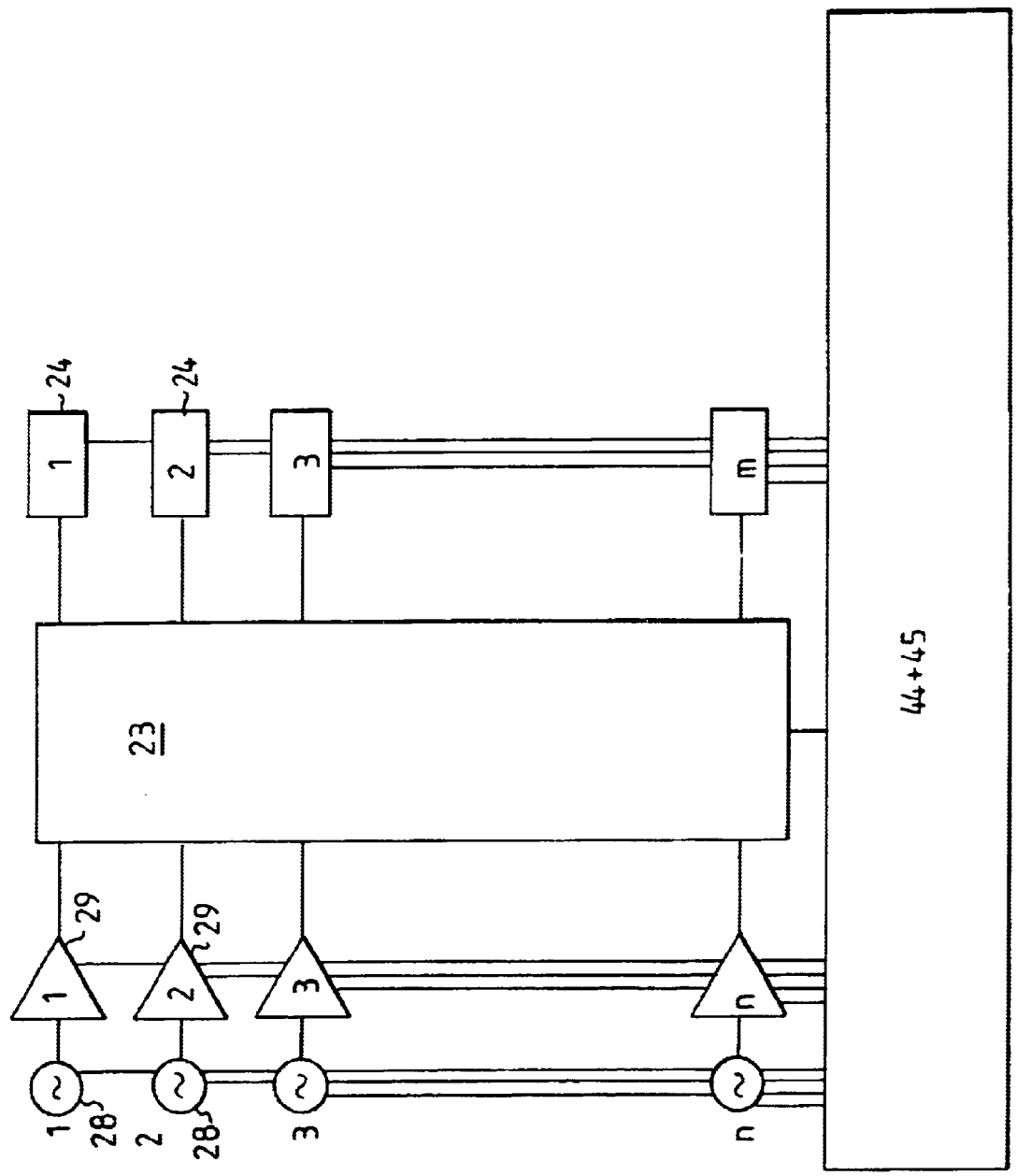

FIG. 5 schematically illustrates a microwave heating system where the microwave heating apparatus may be used.

DETAILED DESCRIPTION OF PREFERRED EMBODIMENTS OF THE INVENTION

FIGS. 1a and 1b show longitudinal sectional schematic illustrations of the microwave heating apparatus according to the present invention.

FIGS. 1c and 1d show schematic illustrations of the microwave heating apparatus according to the present invention in a cross-sectional view of the upper and lower sections, respectively.

In FIG. 1a the dielectric applicator 2 is shown comprising an upper section 4, a lower section 6 and a load chamber 8. In the figure exemplary dimensions in mm are indicated in order to give an impression of the size of the applicator. It should however be noted that these dimensions only are given as examples and that other dimensions naturally are possible for the apparatus that is only defined by the scope of the claims.

FIG. 1b shows that the lower end 10 of the lower section 4 is provided with a microwave coupling means 12 where microwave energy is fed to the applicator via a coaxial feeding line 14 from a microwave energy generator (not shown). The coupling means is connected to the applicator via a metallic antenna in the form of a cylindrical rod inserted and fastened in a recess in the lower end of the lower section. Also shown in FIG. 1b is a support means 16, e.g. of metal, that is used as a support for the applicator, and a metal tube 18 arrange at the outer side of the applicator. The metal tube is further discussed below.

FIG. 1c shows a cross-sectional view of the upper section of the applicator shown in FIG. 1a.

FIG. 1d shows a cross-sectional view of the lower section of the applicator shown in FIG. 1b.

The geometry of the ceramic body, having an axial centered hole not extending all the way to the input antenna, is also provided with a conical lower section, and being dimensioned for the $TM_{011}$ circular mode that reduces the vertical electric field between the load and the ceramic hole bottom. This is mainly due to the determination of the position of the standing wave in the system by these geometric factors. The result is that the sensitivity of the resonant frequency to tolerances of the load height becomes small.

In a preferred optimised embodiment of the invention the dielectric applicator is resonant in a specified (the basic) TM cylindrical mode, and the load permittivity is lower than that of the dielectric applicator.

The dielectric applicator is metalised on all rounded surfaces apart from the top of the applicator and the bottom end where the microwave coupling means is arranged. The top of the applicator is electrically open and this results in a favourable field distribution in the top region of the load, and a reduced sensitivity of the system sensitivity to load height. Since the permittivity of the ceramic is very high, the applicator mode becomes very much beyond cutoff above the top; i.e. the fields decay so rapidly that they have essentially vanished 1 mm above the ceramic surface. Therefore, a low permittivity material and/or a metallic lid or similar can be arranged quite close to the ceramic top, if desired.

Figure 2A:
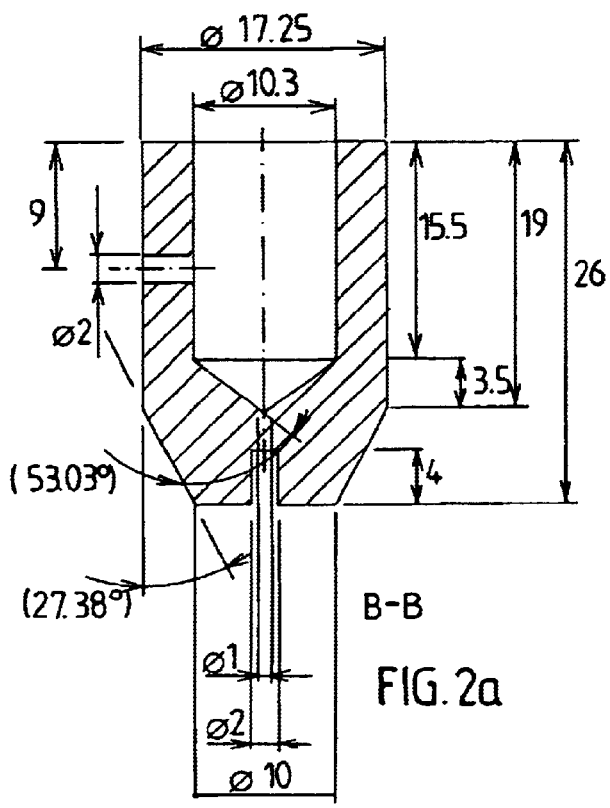
FIGS. 2a and 2b show longitudinal sectional schematic illustrations of a preferred embodiment of the dielectric applicator according to the present invention.
Figure 2B:
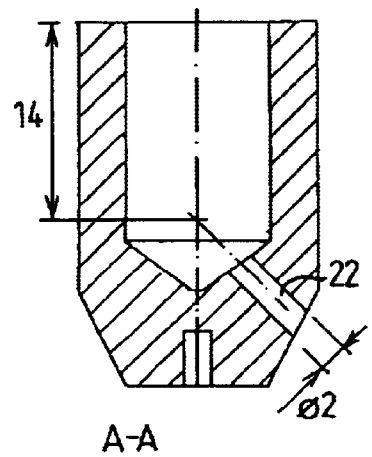
Figure 2C:
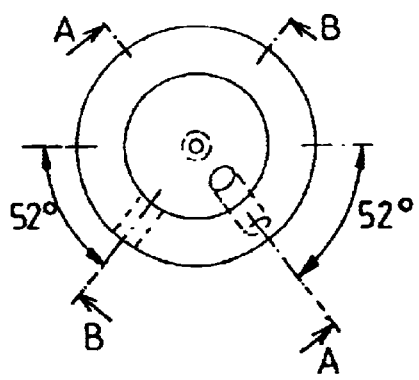
FIG. 2c shows a schematic illustration of a preferred embodiment of the dielectric applicator according to the present invention in a cross-sectional view.
Figure 3A:
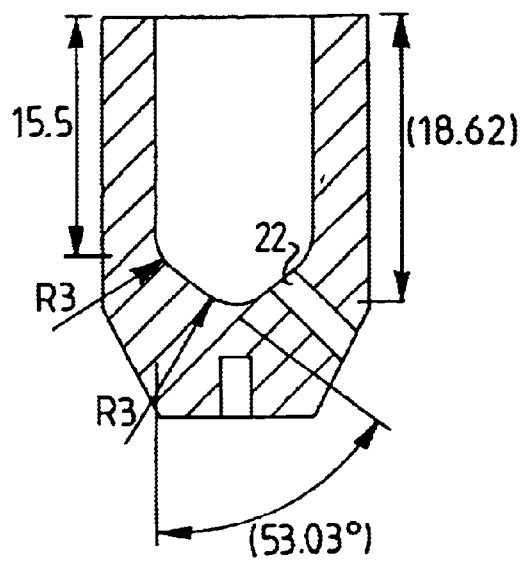
FIGS. 3a–3e show longitudinal sectional schematic illustrations of variations of the preferred embodiment of the dielectric applicator according to the present invention along line A—A in FIG. 2c.
Figure 3B:
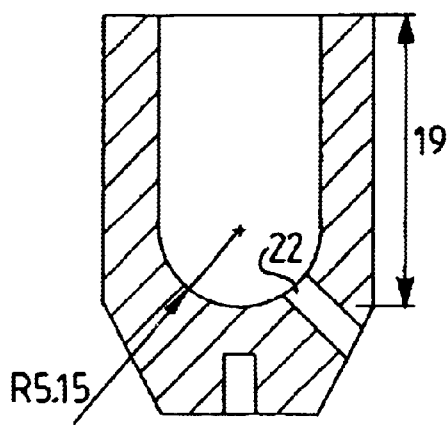
Figure 3C:
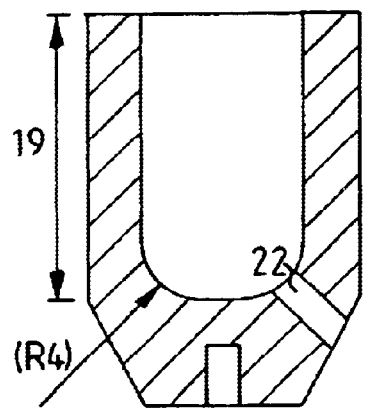
Figure 3D:
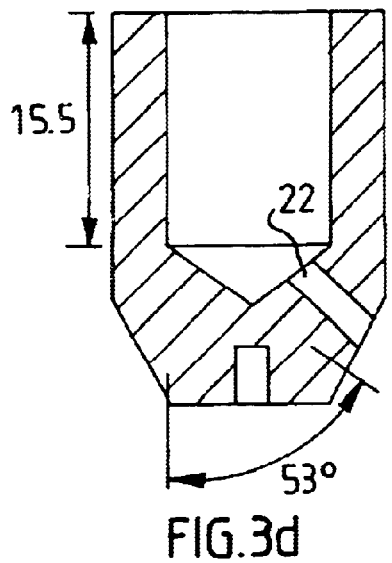
Figure 3E:
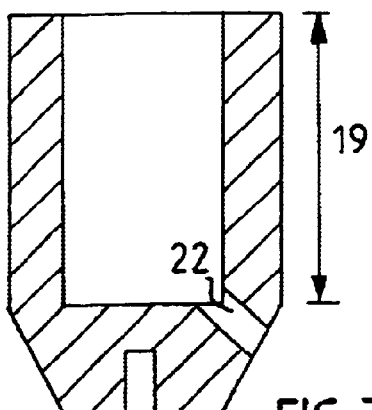

FIGS. 2a and 2b show longitudinal sectional schematic illustrations of a preferred embodiment of the dielectric applicator according to the present invention along lines B—B and A—A, respectively, in FIG. 2c. FIG. 2c shows a schematic illustration of a preferred embodiment of the dielectric applicator according to the present invention in a cross-sectional view. In the figures exemplary dimensions in mm are indicated in order to give an impression of the size of the applicator.

FIGS. 3a–3e show longitudinal sectional schematic illustrations of variations of the preferred embodiment of the dielectric applicator according to the present invention along line A—A in FIG. 2c. In the figures exemplary dimensions in mm are indicated in order to give an impression of the size of the applicator.

The inner shape of the bottom of the load chamber is varied in the different variants shown in FIGS. 3a–3e.

According to a preferred embodiment of the present invention a predetermined number of holes are arranged through the dielectric applicator into the load chamber. The diameter of these holes is 2 mm or less. The purpose is for arranging sensing devices, e.g. temperature sensors, and for air-cooling of the load in the chamber. If these holes are parallel to the direction of the electric field of the standing wave in the applicator, their influence on the performance becomes negligible.

The optimal position of the holes may be determined by numerical modeling and for the upper section of the applicator the position of the hole is at the height where the heating of the load is strongest where there is a minimum of the radial electrical field in the applicator, which would otherwise be disturbed. A hole in the lower section of the applicator has both a radial and an (upward) axial direction. This is advantageous, since such a direction is the most desirable for cooling of the load by airflow through the hole. The radial hole is designated by reference sign 20 in FIG. 2a and the upward directed hole is designated by reference sign 22 in FIGS. 2b and 3a–3e.

According to another preferred embodiment of the present invention the microwave heating system comprises a metal tube, 18 in FIG. 1b, arranged outside the dielectric applicator at least along the upper section of the applicator. In order to achieve a good precision tightening to the applicator the metal tube is heated before the applicator is arranged inside. By arranging the metal tube the dielectric applicator is able to withstand very high pressure.

The material to be used in the dielectric applicator has a permittivity above 50 and preferably above 100. Among the available materials may be mentioned $Al_2O_3$, $TiO_2$ or $XTiO_3$, where X is any group II element such as Ca, Mg or Sr. Zr may partially replace Ti.

The load inserted into the load chamber is preferably included in a load container (not shown) in the form of a conventional glass vial dimensioned specifically to withstand the temperature used during the heating process. The vial is further discussed below.

As indicated above the microwave heating apparatus is fed with microwave energy via a coaxial microwave feeding line 14. The microwaves are generated by a microwave generator (not shown).

According to a preferred embodiment of the present invention the microwaves have a frequency within a predetermined frequency range around 2450 MHz.

It is to be noted that an axially repetitive pattern naturally also is possible for the $TM_{01}$ mode applicator according to the preferred embodiment of the present invention.

By using for example the $TM_{012}$ mode with the load approximately in the top quarter of the applicator, the same heating pattern as with the $TM_{011}$ mode is achieved, but the resonant frequency variation with load permittivity is halved. The mode $TM_{010}$ typically gives too focussed heating at the load tip.

Figure 4A:
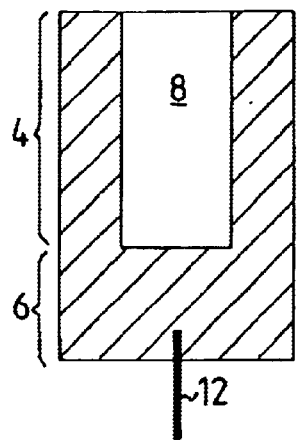
FIGS. 4a–4e show longitudinal sectional schematic illustrations of various embodiments of the microwave applicator according to the present invention.

FIG. 4a discloses a simplified schematic drawing of the dielectric microwave applicator according to a second preferred embodiment of the present invention. The applicator comprises an upper section 4, a lower section 6, a load chamber 8 and an axially arranged coupling means 12. It should be noted that the applicator according to this embodiment has the same outer diameter along the entire applicator body.

In the following an alternative embodiment of the present invention will be described with references to FIG. 4b. According to this embodiment the dominating mode in the applicator is $TE_{11}$.

The overall geometry of the ceramic body of the applicator in this embodiment is essentially the same as for the above-described TM-applicator, namely, a circular cylindrical, with a circularly cylindrical hole at the top, for insertion of the vial.

There must, however, be a different feed due to the different applicator field configuration. A basic alternative is to use a radial inwards-pointing short probe antenna as the couplings means arranged in the lower section near the bottom end, from a coaxial line.

Figure 4B:
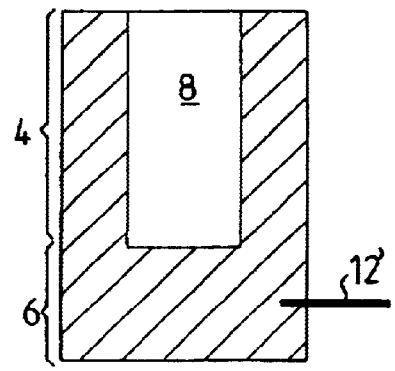

In FIG. 4b similar reference signs as in FIG. 4a are used, wherein the applicator comprises an upper section 4, a lower section 6, a load chamber 8 and a radial coupling means 12'.

Figure 4C:
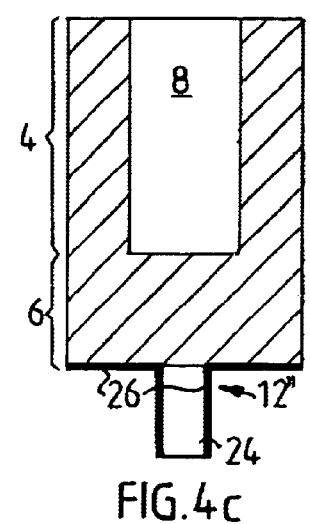

However, a side-fed applicator will require extra space and a 90° bend in a multi-applicator system. Therefore, an axial feed from below is more desirable. Preferably this is achieved by using a strip-line feed 24 from below to the bottom surface of the ceramic body. This embodiment is schematically illustrated in FIG. 4c with coupling means 12". It may consist of a pair of small thin flat conductors 26 coming from below and just being welded to the straight edges of two "half-moons" of metalisation of the bottom of the ceramic cylinder (i.e. having a diametrical non-metalised "slot"). In order to minimise leakage from such a double-wire line, and to strengthen it mechanically, there is preferably a ceramic body between the conductors; the conductors may thus just be double-sided metalisations on a ceramic stripline.

The performance of this alternative applicator does not depend on which type of feed is used.

The optimisation of applicator data for resonant frequencies in the vicinity of 2.45 GHz having a load diameter of 9 mm directly contacting the cylindrical applicator hole wall resulted in the following data:

Ceramic overall dimensions: Ø14 mm; H19 mm
Load hole dimensions: Ø10 mm; H13.5 mm
Load dimensions: Ø9 mm; cylindrical height 7.5 mm plus frustrum conical bottom height 2 mm (i.e. volume about 0.7 ml; the distance from load meniscus to applicator top: 3 mm)
Ceramic material permittivity: 64-j0. Note that this is lower than in the $TM_{11}$ applicator, which has Ø17 mm and permittivity 100.

There are two distinct resonances in the frequency region of interest. The lower frequency resonance is characterised by a dominant heating of the tip region of the load; this results in less frequency change with varying dielectric properties of the load. The higher frequency resonance heats significantly more evenly—as a matter of fact more evenly also than the $TM_{01}$ mode—with a maximum somewhere along the load height. Formally, the lower frequency resonance can be labelled $TE_{11}½$ and the higher frequency resonance can be labelled $TE_{111}$.

The heating pattern in the horizontal planes is quite even, in spite of the fact that the horizontal E field intensity is stronger at the axis. The reasons are that the load does not extend all the way to the metalised periphery of the applicator, and that the heating pattern can also be said to be created by the H field inducing currents in it.

It is to be noted that the strong radial E (and hence also the displacement current) field are strongly influenced by the normal airgap between the vial and ceramic, since the permittivities of these are high. The perpendicular E component will be up to the permittivity times stronger in the airgap. This causes a strong sensitivity of the resonant frequency to the airgap dimensions.

The resonant frequency changes with load permittivity and unchanged geometry are given in Table 1, with frequencies in MHz. It is clearly seen that the frequency variation is very large for the high resonance; as a comparison the difference between loads with permittivities 10 and 50 are about 100 MHz with the $TM_{01}$ applicator.

TABLE 1

Resonance data

| Mode | Low resonance frequency | High resonance frequency |
| --- | --- | --- |
| Load 24-j2 | 1946 | 2636 |
| Load 50-j2 | 1846 | 2342 |
| Frequency difference. | 100 | 294 |

There is an additional problem with the low frequency resonance since the strongest heating is in the tip region, the exact vertical distance between the load tip and the bottom of the hole in the ceramic becomes very sensitive. Again modelling has been used for quantification: an increase of this air distance by 0.5 mm results in a 66 MHz increase of the low resonant frequency, and in virtually no change of the high resonant frequency. The corresponding change for the $TM_{01}$ applicator is less than 10 MHz.

As mentioned above, there is also sensitivity to the airgap between the vial and ceramic hole wall, that also includes the vial glass thickness, since the glass permittivity is also relatively low.

The resonant frequency behaviour with and without a ½ mm airgap layer, with the thickness of the ceramic around the hole reduced correspondingly, was modelled, now with an ½ mm air-layer also below the frustrum conical load end, in both cases. The load permittivity was 24-j2 and the following was found:

The lower frequency resonance changed insignificantly, from 2320 to 2318 MHz. This is explained by the almost complete power absorption taking place in the (unchanged) tip region.

The higher frequency resonance increased from 2876 to 3232 MHz. This large change may be explained by the displacement current issue discussed above. In general, the various poorer performance aspects of the behaviour of the TE mode applicator can be deduced by introducing diffraction phenomena caused by the load curvature.

There is no first direct modal coupling from the applicator to cylindrical elongated loads by TE modes as is the case for the $TM_0$ mode. However, with the geometry used here, and the load directly contacting the applicator ceramic, the applicator mode field is well-matched (with respect to impedance) to the load field when the applicator ceramic and load permittivities are very similar. There is therefore a good energy transfer, resulting in a heating pattern following directly from the $TE_{11}$ mode. However, when the load permittivity is lower, or there is an airgap at the tip of the load, the mode field incompatibility (lack of D field coupling) results in a "non-modal" energy transfer by a nearfield induction of current in the load tip by the horizontal H field component, so that another, lower frequency resonance is created. Since the typical resonances are far away from each other, and their Q values are rather high (typically about 50 for the lower frequency resonance), there remains a condition for a good performance, by seeing to it that the load periphery is contacting the applicator hole wall. What happens can also be said to be related to the fact that there is no inherent diffraction resonance for TE modes in a free dielectric rod with diameter less than about a half wavelength that results in a weak energy transfer by ordinary propagation, unless there is a quite similar permittivity of the load and applicator.

Although the TE mode applicator has a less advantageous coupling between the mode and load it would be possible to use this applicator as a single-feed long applicator (by "long" is meant many wavelengths in the system), with the load liquid flowing directly in the applicator hole.

Since the microwave feeding input port(s) are simple when radial coaxial antennas are used, a through-flow system design may be achieved in particular when the design is such that there is a very similar permittivity of the load and the surrounding ceramic of the applicator.

Figure 4D:
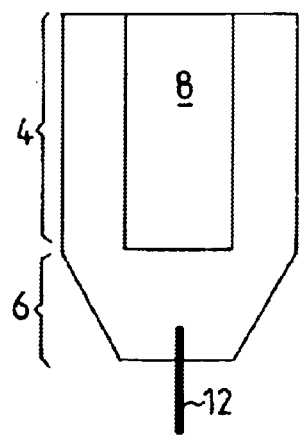
Figure 4E:
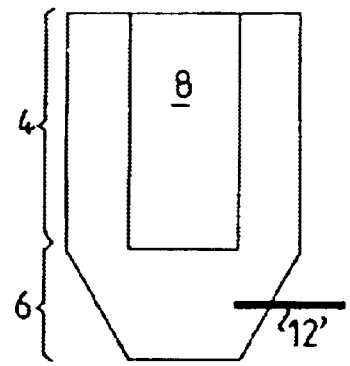

FIGS. 4d and 4e disclose still an alternative embodiment of the present invention where the microwave heating apparatus comprises an air-filled microwave applicator provided with a lower section having an increasing cross-sectional area from the lower end to the intersection to the upper section. In FIG. 4d the coupling means is arranged to feed microwave energy axially and in FIG. 4e it is arranged to feed microwave energy radially with regard to the centre axis of the elongated applicator.

In an advantageous embodiment of the present invention a predetermined number of the above described microwave heating apparatuses is arranged in a microwave heating system, in order to allow parallel handling and heating of loads. A microwave heating system for parallel use of many microwave applicators is disclosed in WO-00/36880.

Below follows with references to FIG. 5 a description of a microwave heating system that allows parallel handling and heating of loads applicable for applicators according to the present invention. It should however be noted that many of the described details naturally are applicable when using a single microwave heating apparatus.

The number n of signal generators that are separately amplified by signal amplifiers 29 are connected to the number m of separate applicators 24 through the distributing network 23, represented by the box in the center. Each separate applicator comprises a pressure monitoring means, temperature monitoring means, and a sample consisting of a glass vial, wherein the load is included, with a metal cap and a septum.

The system also consists of the following parts that are shared for all samples: power supply 44, cooling system for both the applicators and the microwave generators, shielding box with lid, control unit/computer 45 with software both for planning experiments and controlling the experiment. The samples may be prepared automatically and inserted into the instrument automatically. There might also be a connection to an analysis equipment. All system parts will be described in detail below.

The microwave generator is preferably based on semiconductor technology and consists of a VCO (voltage controlled oscillator) that generates the frequency variable microwaves, one or more amplifiers that amplifies the power of the microwaves to the desired variable level (0–20 W in this case), a monitoring unit (directional coupler), which monitors the forward and reflected power in order to obtain information to control the optimum frequency, a microprocessor that will control the power level of the amplifier and the frequency of the oscillator and a dummy load to take care of the power not absorbed by the sample and applicator. The microwave generator will also contain other unspecified conventional components to ensure the functionality, e.g. connectors.

The microwave applicator is preferably a semi-resonant ceramic applicator according to the above-described applicator consisting of a hollow ceramic cylinder with a metal surface and a connector with an input antenna in the lower section. The ceramic has preferably high dielectric properties (in a preferred embodiment $\epsilon=100$).

The pressure monitoring means is a load cell with a strain gauge sensor that is in contact with the septum of the vial. The pressure sensor detects the deformation of the septum and transforms it into a pressure reading. The pressure sensor makes it possible to avoid explosions of the glass vial and to regulate the reaction conditions depending on pressure. The advantage of the strain gauge type of pressure sensor is that it is small and that it can measure the pressure without contact with the contents of the vial, i.e. it does not need cleaning between the different samples.

The temperature monitoring means may be a thermocouple in contact with the outside of the glass vial. The contact point at the glass vial is below the surface level of the liquid to ensure a good temperature reading despite the low thermal conductivity of the glass. The contact surface of the glass may be improved by applying a metal layer on the glass to enhance the thermal conductivity from the glass to the thermocouple. Since the mode field pattern of the applicator is known in the preferred embodiment of the invention (of the TM type), it is possible to use e.g. metal rings on the vial, since these will then be perpendicular to the displacement current paths in the applicator/load). The advantages of the thermocouple temperature sensor is that it is small, will not interfere with the microwave field if it is inserted through the applicator at the right level (which is again possible to optimize since the applicator mode is known) and that it is inexpensive.

The temperature sensor might also consist of a fibre optic IR sensor that is monitoring the glass vial below the surface level of the liquid.

The advantages with the fibre optic temperature sensor is that it is small and that it will not interfere at all with the microwave field since it contains no metal parts.

The sample vial may be made of borosilicate glass with a metal cap (of e.g. aluminium) and a rubber septum with Teflon® (PTFE) coating. The shape and other features of the glass vial are designed to withstand high pressures. The vials will be placed in a tray specially designed for the vials to make it possible to insert all samples simultaneously into the instrument. The spacing between the vials in the tray can be the same as in the standardized micro titre format.

The glass vial is preferably made of borosilicate glass since it absorbs a very small amount of microwaves and hence the glass will not be heated by the microwaves, only the contents. The cap is to pressure seal it and makes it possible to perform high pressure chemistry. The rubber septum is possible to penetrate with a needle, i.e. it is possible to dispense chemicals into it and from it after the vial has been capped and the PTFE coating is to make it chemically resistant. The tray gives a more convenient handling of the samples than if they have to be inserted one by one and the spacing of the vials gives the applicability of the tray to different dispensing robots. If the tray has the spacing of the microtitre format it would be compatible with most dispensing robots. The rim of the glass vial is to hold the glass vial in place and for pressure sealing and strength purposes.

The power supply and the cooling of the microwave generators are designed according to normal standards and will be dimensioned for the number of samples and the power need of the amplifiers. It will supply the instrument with the needed power (no high voltage) and should be of a conventional type. The best conventional method for the purpose is used depending on the demands of power and cooling.

The cooling system for the microwave generator may e.g. be achieved by a chimney construction, forced air or water-cooling. The type of cooling system depends on the cooling need of the microwave generator. The lower the efficiency of the amplifiers is the higher is the need for cooling.

The cooling system for the applicators should be forced air around the applicators and also inside the applicators around the vials. There is an inlet from the bottom of the applicator where the forced air is applied. The cooling media could also be cooled by air or an inert gas.

The cooling of the applicator might be necessary to keep the applicator below a predetermined temperature level, e.g. 150 degrees, since parts of the applicator will not tolerate temperatures above. The cooling of the applicator will decrease the temperature cross talk between different samples. The cooling of the samples with a cooling medium enables a short cooling time after the reaction, it could also be used as an active component of the temperature regulation.

The controlling software is also a monitoring software since it regulates in dependence of the specific properties of the sample. The resonance frequency is monitored during the heating process in order to set the frequency of the VCO to the resonance frequency of the sample. The resonance frequency changes with the dielectric properties of the sample, the sample volume and the temperature of the sample. The temperature and pressure is monitored to have a correct coupling to the amplifier to control the output power to achieve the correct temperature profile. The regulation software may be dynamic and take the dielectric properties of the sample into account (which it will obtain by the resonance frequency, the width of the resonance frequency and the temperature increase). The regulation software will be distributed between the microprocessor unit in the microwave module and a computer that will be shared for all samples. The software part for the microprocessor should also be possible to download via the computer via a CAN-bus or RS-485. The regulation software consists of a PI-controller with a pre-filter or a more complex controller.

The following example further illustrates the connection between the resonance frequency and the dielectric properties of the load.

For low loss loads, the resonance frequency bandwidth may be quite small. This means that there is a need to adjust the frequency as the resonant frequency varies between different loads and at different temperatures. A typical method is to first sweep the generator frequency over e.g. 2400 to 2500 MHz, at low power, and then detect the amplitude of the reflected power at the third arm dummy load of a three-port circulator connected between the applicator and generator. The signal is minimum when the reflected power is minimum and thus the absorbed power is maximum. After this sweep, which may last for two seconds and be in 200 kHz digitized steps, full power at the optimum frequency is applied. When the detected (reflected) power level increases, the frequency is changed upward in increments, until the measured power is back to the same value. If is not, the true minimum is sought for, by variation over an interval of e.g. 10 MHz around the last set frequency.

It should be noted that since the permittivity of almost all load liquids decrease with increasing temperature, the resonant frequency increases during heating.

The controlling software takes into account the specific properties of each sample and finds the optimal regulation parameters for each sample. The monitoring functionality of the software can be very useful for finding information on the dielectric properties of the reaction and the chemicals. The regulation software can be even more versatile by adding the active cooling component, which can compensate for e.g. exothermic reactions. By down-loading parts of the controlling software to the microprocessor it makes it easy to update the software and to include improvements and it also provides the possibility to choose between different types of regulations for different samples.

The planning software is a remodeling of an already known workflow manager software with which it is possible to plan the set of reactions. It is possible to have a matrix form where it is possible to vary the temperature and time in certain intervals to enable a fast planning of a large number of samples for e.g. reaction condition optimization. The software may include some kind of multivariate analysis for reaction optimization purposes or other accessory software. The instrument should be possible to connect to a workflow manager network and it should be possible to access a workflow manager reaction knowledge database.

The planning software makes it possible to plan the reactions in the office and prepare the reactions before loading the system and have overnight runs. This increases the throughput of the system. It will also be connected to the workflow manager system, which will give several synergy effects between the instruments. Since it is possible to vary the time and temperature individually for each sample, the instrument will be of great use as a reaction optimization equipment. This function would be improved by adding a multivariate analysis program and a coupling to the analysis of the reaction.

The microwave shielding box is necessary in order to shield the environment from the microwaves. It must also be designed to reduce the coupling between adjacent applicators/amplifiers (the so-called cross talk) to a low level, since the amplifier principle makes the overall system sensitive in this respect. It is constructed in accordance to conventional methods that make it possible to choose any frequency since it will decrease the radiation to accepted levels and hence there will be no disturbance from the machine on other microwave applications. There should be a lid for easy access of the samples. The pressure sensors will be incorporated in the lid.

Automatic dispensing/sample insertion/analysis may also be included. According to a first version of the system, the instrument is manual, therefore there is an interest in making it compatible with conventional dispensing robots. To increase the throughput of the system it should be connected to a dispensing robot, which is possible to program via the above-mentioned software. The dispensing robot could dispense the chemicals for the reactions through the septa of the vials. A multi syringe dispenser may be used to dispense a number of samples at the same time. The sample trays may be inserted into the instrument with a robot, which makes it possible to plan several trays that can be prepared during an overnight run and processed one by one. It should also be possible to queue trays from different experiments planned by different users. Another way of increasing the performance of the system is to have a connection to an analysis instrument or to have an analysis instrument built-in. The connection to an analysis instrument could be by an injection port connected to a GC-MS, LC-MS, etc. The information from the analysis could be fed back to the instrument and used for planning the next set of experiments. The built in analysis equipment could be an IR or UV spectrometer.

Below is a short listing of typical values for a number of parameters in the microwave heating system according to the present invention.

The number of samples varies from 1 to approximately 500. The preferred number of samples range is 10–100.

The volume for each sample could vary from 0.10 ml to 5.0 ml and the preferred volume range is 0.5 ml to 1.5 ml.

The output maximum power from the microwave generator could vary from 5 W to 1500 W and the preferred power range is 20–50 W.

The frequency range could be from 900 MHz to 3000 MHz and the preferred frequency range is from 2400 MHz to 2500 MHz. Another suitable range could be from 1100 MHz to 1300 MHz.

The bandwidth of the microwaves could vary from 50 MHz to 1000 MHz and the preferred bandwidth is 100–200 MHz.

The temperature range could be from 20° C. to 300° C. and the preferred temperature range is from 20° C. to 250° C.

The pressure range could be from 1 bar to 100 bar and the preferred pressure range is from 1 bar to 20 bar.

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. Microwave heating apparatus comprising a dielectric microwave applicator with an elongate shape and an upper end and a lower end, the applicator is provided with a load chamber adapted to receive a load to be heated and extending coaxially, with regard to the centre axis of the applicator, from the upper end to a predetermined distance from the lower end of the applicator, the applicator is further provided with a microwave coupling means adapted to feed microwave energy to said applicator, wherein said dielectric applicator comprises two sections, an upper section provided with said load chamber and an impedance matching lower section including said coupling means.

2. Microwave heating apparatus according to claim 1, wherein said lower section has an increasing cross-sectional area from the lower end to the intersection to the upper section.

3. Microwave heating apparatus according to claim 2, wherein the cross-section of the lower section is not constantly increasing.

4. Microwave heating apparatus according to claim 1, wherein said coupling means is coaxially arranged with regard to the centre axis of the applicator providing an axial TM type mode in the applicator.

5. Microwave heating apparatus according to claim 1, wherein said coupling means is radially arranged with regard to the centre axis of the applicator providing a TE type mode in the applicator.

6. Microwave heating apparatus according to claim 1, wherein said lower section has the form of a truncated cone to improve wave reflection and impedance matching functions.

7. Microwave heating apparatus according to claim 1, wherein said applicator has a rotational symmetrical shape.

8. Microwave heating apparatus according to claim 1, wherein the material permittivity of the dielectric applicator is equal or greater than the material permittivity of the load wherein the load $TM_{00}$ diffraction effect is reduced.

9. Microwave heating apparatus according to claim 1, wherein said applicator is made from a ceramic material.

10. Microwave heating apparatus according to claim 9, wherein said microwave generator is based on semiconductor technology and consists of a voltage controlled oscillator (VCO) that generates the frequency variable microwaves.

11. Microwave heating apparatus according to claim 1, wherein said lower section is a solid ceramic body provided with said coupling means and dimensioned for the $TM_{011}$ circular mode.

12. Microwave heating apparatus according to claim 1, wherein said predetermined distance from the lower end of the applicator is essentially the same as the height of the lower section.

13. Microwave heating apparatus according to claim 1, wherein said predetermined distance equals less than half the entire length of the applicator.

14. Microwave heating apparatus according to claim 1, wherein the relationship between the diameter of the opening of the load chamber and the outer diameter of the upper section is greater than 0.5.

15. Microwave heating apparatus according to claim 1, wherein the volume of the load chamber is less than 5 ml.

16. Microwave heating apparatus according to claim 15, wherein the volume of the load chamber is less than 2 ml.

17. Microwave heating apparatus according to claim 1, wherein the load chamber is adapted to receive a sample vial where the load is included.

18. Microwave heating apparatus according to claim 1, wherein said microwave energy includes microwaves within a predetermined frequency range and is generated by a microwave generator.

19. Microwave heating apparatus according to claim 1, wherein the upper section of said applicator has a cylindrical outer shape.

20. Microwave heating apparatus according to claim 1, wherein said load chamber is cylindrical.

21. Microwave heating apparatus according to claim 1, wherein said apparatus further comprises a metal tube arrange to enclose the outside of the applicator at least along the upper section of the applicator.

22. Microwave heating apparatus according to claim 1, wherein a predetermined number of holes are arranged through the dielectric applicator into the load chamber, wherein sensing devices and/or cooling devices are provided in said holes.

23. Microwave heating system, including a plurality of microwave heating apparatuses according to claim 1 arranged to allow parallel handling and heating of loads.

24. Microwave heating apparatus comprising an air-filled microwave applicator with an elongate shape and an upper end and a lower end, the applicator is provided with a load chamber adapted to receive a load to be heated and extending coaxially, with regard to the centre axis of the applicator, from the upper end to a predetermined distance from the lower end of the applicator, the applicator is further provided with a microwave coupling means adapted to feed microwave energy to said applicator, wherein that said air-filled applicator comprises two sections, an upper section provided with said load chamber and an impedance matching lower section including said coupling means, wherein said lower section has an increasing cross-sectional area from the lower end to the intersection to the upper section.

* * * * *